US009614925B2

(12) United States Patent
Kovvuri et al.

(10) Patent No.: US 9,614,925 B2
(45) Date of Patent: Apr. 4, 2017

(54) INTELLIGENT FILE PRE-FETCH BASED ON ACCESS PATTERNS

(71) Applicant: FutureWei Technologies, Inc., Plano, TX (US)

(72) Inventors: Vaishnav Kovvuri, San Jose, CA (US); Jim Zhao, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 278 days.

(21) Appl. No.: 14/231,508

(22) Filed: Mar. 31, 2014

(65) Prior Publication Data

US 2015/0281390 A1  Oct. 1, 2015

(51) Int. Cl.
*G06F 15/16* (2006.01)
*H04L 29/08* (2006.01)

(52) U.S. Cl.
CPC .......... *H04L 67/2842* (2013.01); *H04L 67/06* (2013.01)

(58) Field of Classification Search
CPC ............................ H04L 67/2847; H04L 67/42
USPC ........................................................ 709/203
See application file for complete search history.

(56) References Cited

U.S. PATENT DOCUMENTS

| | | | | |
|---|---|---|---|---|
| 6,779,119 | B1 * | 8/2004 | Moshfeghi | G06F 17/30132 707/999.002 |
| 6,868,439 | B2 * | 3/2005 | Basu | G06F 17/30902 707/E17.12 |
| 8,966,011 | B2 * | 2/2015 | Friedrich | H04L 29/12066 709/203 |
| 2002/0007402 | A1 * | 1/2002 | Thomas Huston | G06F 17/30902 709/217 |
| 2003/0187984 | A1 | 10/2003 | Banavar et al. | |
| 2006/0294223 | A1 * | 12/2006 | Glasgow | H04L 67/2847 709/224 |
| 2007/0216674 | A1 | 9/2007 | Subramanian | |
| 2010/0306652 | A1 * | 12/2010 | Bolger | A63F 13/12 715/706 |
| 2011/0184936 | A1 * | 7/2011 | Lymberopoulos | G06F 17/30902 707/721 |

(Continued)

FOREIGN PATENT DOCUMENTS

EP  2400719 A1  12/2011
WO  0246972 A2  6/2002

OTHER PUBLICATIONS

International Search Report and Written Opinion received in International Application No. PCT/CN2015/075075 mailed Jun. 30, 2015, 11 pages.

*Primary Examiner* — June Sison
*Assistant Examiner* — Dixon Dabipi
(74) *Attorney, Agent, or Firm* — Slater Matsil, LLP

(57) ABSTRACT

Files and/or file updates can be pre-fetched from a server to reduce file access periods as well as shift network usage from high traffic periods to low traffic periods. For example, a file that was previously expelled from a cache can be pre-fetched from the server prior to a future period in which a client is likely to re-access the file. As another example, a file update for a file that remains stored in the cache can be pre-fetched from the server prior to a future period in which a client is likely to re-access the file. The file update may then be used to update the stored file. The file and/or updated-file can then be provided directly from the cache to the client when the client re-accesses the file.

25 Claims, 13 Drawing Sheets

(56) References Cited

U.S. PATENT DOCUMENTS

| | | | | |
|---|---|---|---|---|
| 2012/0007402 | A1* | 1/2012 | Stilleke | B60N 2/2252 297/362 |
| 2012/0110119 | A1* | 5/2012 | Levicki | H04N 21/2541 709/217 |
| 2013/0226837 | A1* | 8/2013 | Lymberopoulos | G06F 17/30902 706/12 |
| 2013/0339617 | A1* | 12/2013 | Averbouch | G06F 12/0862 711/133 |

* cited by examiner

|  | d1 | d2 | d3 | d4 | d5 | d6 | d7 | d8 | d9 |
|---|---|---|---|---|---|---|---|---|---|
| OPEN FILE F1 TWICE ALTERNATE DAY | 2 | 1 | 3 | 1 | 3 | 1 | 3 | 1 | 3 |
| OPEN F2 ON DAY 1 AND NEVER OPENED | 100 | 50 | 16 | 4 | 0 | 0 | 0 | 0 | 0 |
| OPEN F3 ON ALTERNATE DAYS BY A FACTOR OF 10 | 10 | 5 | 15 | 7 | 17 | 8 | 18 | 9 | 19 |
| OPEN F4 EVERY DAY | 1 | 2 | 3 | 4 | 5 | 6 | 7 | 8 | 9 |
| OPEN FILE F5 ON RANDOM | 40 | 20 | 30 | 15 | 20 | 10 | 11 | 5 | 6 |

| TIME | PATH NAMES | | | | PATH NAMES | DETAILS |
|---|---|---|---|---|---|---|
| 8:00AM | F2 — F1 — F5 — Fx | | | | F1 | 8:00AM, WEIGHT, USER, lst_access_time |
| 9:00AM | F8 | | | | | |
| 10:00AM | | | | | F2 | |
| 11:00AM | | | | | F5 | |
| 7:00AM | | | | | | |

INTELLIGENT FILE PRE-FETCH BASED ON ACCESS PATTERNS

TECHNICAL FIELD

The present invention relates generally to managing the allocation of resources in a network, and in particular embodiments, to techniques and mechanisms for intelligent file pre-fetch based on access patterns.

BACKGROUND

Data caching is a mechanism for temporarily storing content (e.g., files, etc.) on a destination side of the network to reduce bandwidth usage, server load, and perceived lag when that content is re-accessed by the user. Caching may be applied in a variety of different network implementations, such as in content distributed networks (CDNs), enterprise database networks, internet service provider (ISP) networks, and others. Generally speaking, caching is performed by fetching content in response to a client accessing the content, storing the content in a cache for a period of time, and providing the content directly from the cache when the client attempts to re-access the content.

SUMMARY OF THE INVENTION

Technical advantages are generally achieved, by embodiments of this disclosure which describe techniques and mechanisms for intelligent file pre-fetch based on access patterns.

In accordance with an embodiment, a method for efficient content access is provided. In this example, the method comprises fetching a file from a server in response to a client accessing the file. The file is stored in a cache memory upon being fetched from the server. The method further includes expelling the file from the cache memory after the client stops accessing the file, and pre-fetching the file from the server without the client attempting to re-access the file. The file is pre-fetched from the server after having been expelled from the cache memory. The file is re-stored in the cache memory upon being pre-fetched from the server. An apparatus for performing this method is also provided.

In accordance with another embodiment, another method for efficient content access is provided. In this example, the method comprises fetching a file from a server in response to a client accessing the file, storing a version of the file in a cache memory when the client stops accessing the file, and pre-fetching a file update for the file from the server without the client attempting to re-access the file. The file update is pre-fetched from the server after the client has stopped accessing the file. The method further comprises using the file update to update the version of the file stored in the cache memory prior to the client attempting to re-access the file. An apparatus for performing this method is also provided.

In accordance with yet another embodiment, another a method for pre-fetching files from a server is provided. In this example, the method comprises determining an access pattern of a client during previous iterations of a recurring time instance. The access pattern corresponds to a frequency in which files are accessed by a client during previous iterations of a recurring time instance. The method further includes assigning access rankings to the files in accordance with the access pattern. Files that were accessed more frequently are assigned higher access rankings than files that were accessed less frequently. The method further includes selecting one or more the files in accordance with the access rankings, and pre-fetching the one or more files from one or more servers without the client attempting to access the one or more file. The one or more files are pre-fetched prior to a future iteration of the recurring time instance. The one or more files are stored in a cache memory after being pre-fetched from the one or more servers. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

The storage capacity of cache memory is finite, and content is not typically stored infinitely in the cache. Instead, content that is not re-accessed with sufficient frequency is eventually dropped from the cache to make room for content that has been accessed more recently. Once the content is dropped from the cache, it must generally be re-retrieved from the server before it can be re-accessed by the client. This may result in access latencies for content that is re-accessed periodically over long time intervals.

Aspects of this disclosure provide techniques for pre-fetching files and/or file updates from a server prior to the files being re-accessed by a client, which may reduce file access periods as well as shift network usage from high traffic periods to low traffic periods. In some embodiments, a file that was previously expelled from a cache is pre-fetched from the server prior to a future period in which a client is likely to re-access the file. In other embodiments, a file update for a file that remains stored in the cache is pre-fetched from the server in a similar fashion. Pre-fetching may be performed during a low traffic period in order to reduce traffic loading during a future high traffic period, e.g., the start of the work day, etc. In some embodiments, multiple files are pre-fetched based on access rankings associated with the files. Access rankings may be derived from historical access patterns of the client. For example, the future period may correspond to a future iteration of a recurring time instance (e.g., 9-10 AM on weekdays), and the access rankings may be based on access patterns of the client during previous iterations of the recurring time instance. Access patterns may correspond to a frequency in which files are accessed by the client such that files accessed more frequently are assigned higher access rankings than those accessed less frequently. These and other aspects are explained in greater detail below.

Figure 1:
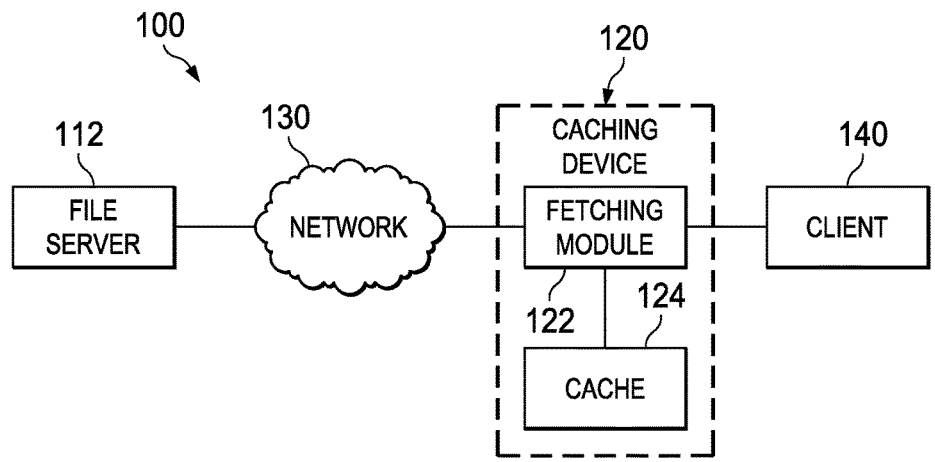
FIG. 1 illustrates a diagram of an embodiment network environment adapted to support file pre-fetching.

FIG. 1 illustrates a network environment 100 adapted to support file pre-fetching. As shown, the network environment 100 includes a file server 112, a caching device 120, a network 130, and a client 140. The file server 112 may be any component or collection of components configured to store files. The caching device 120 may be any component or collection of components configured to fetch files from the files server 112 on behalf of the client 140, and to cache the file so that the file may be accessed by the client 140. The caching device 120 may include a fetching module 122 for fetching the files and a cache 124 for storing the files. The client 140 may correspond to any an entity (e.g., an individual, office, company, etc.) or group of entities (e.g., subscriber group, etc.) that access files stored in the file server 112. In embodiments provided herein, the caching device 120 may pre-fetch files and/or file updates from the file server 112 prior to the files being re-accessed by the client 140, and store the pre-fetched files in the cache 124. The files may be pre-fetched based on access patterns of the client 140, and may be provided directly from the cache 124 to the client 140 upon being re-accessed by the client 140.

Figure 2:
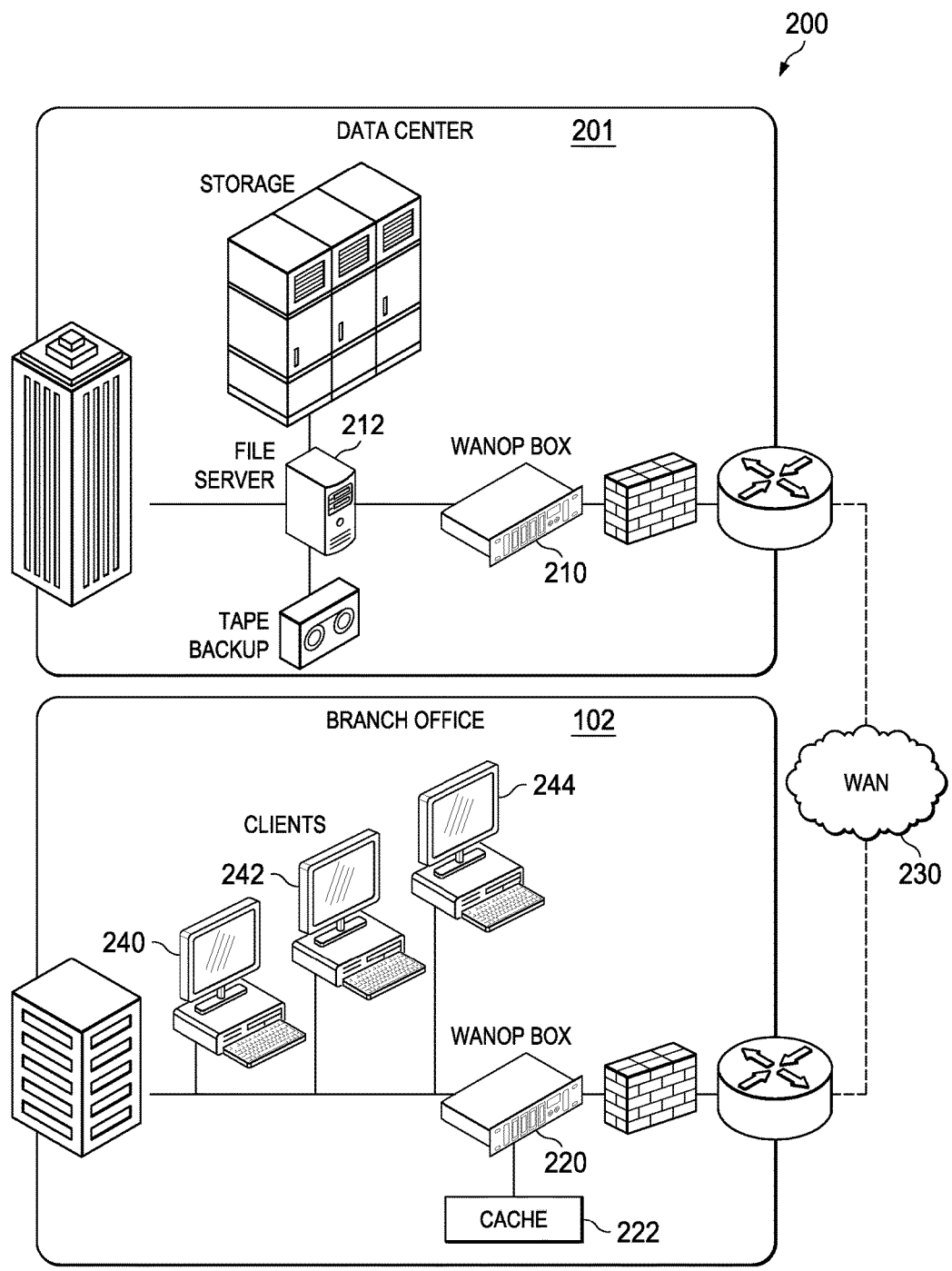
FIG. 2 illustrates a diagram of an embodiment enterprise network adapted to support file pre-fetching.

The embodiment pre-fetching techniques provided by this disclosure are applicable to any network environment in which files stored on one side of a network are cached on another side of the network, including content distributed networks (CDNs), enterprise database networks, internet service provider (ISP) networks, wide area optimization networks, and others. FIG. 2 illustrates an embodiment enterprise database network 200 adapted to support file pre-fetching. As shown, the embodiment enterprise datacenter network 200 includes a data center 201 and a branch office 202, which are configured to communicate via a wide area network 230. The data center 201 may include various components, such as a WAN optimization (WANO) box 210 and a file server 212. The branch office 202 may also include a WANO Box 220, as well as a cache 222 and other devices for allowing the clients 240, 242, 244 to access information stored in the data center 201. The WANO boxes 210, 220 may be any devices configured to provide an interface to the WAN 230, and may include fetching modules and/or other components for performing the pre-fetching techniques provided by this disclosure.

Figure 3:
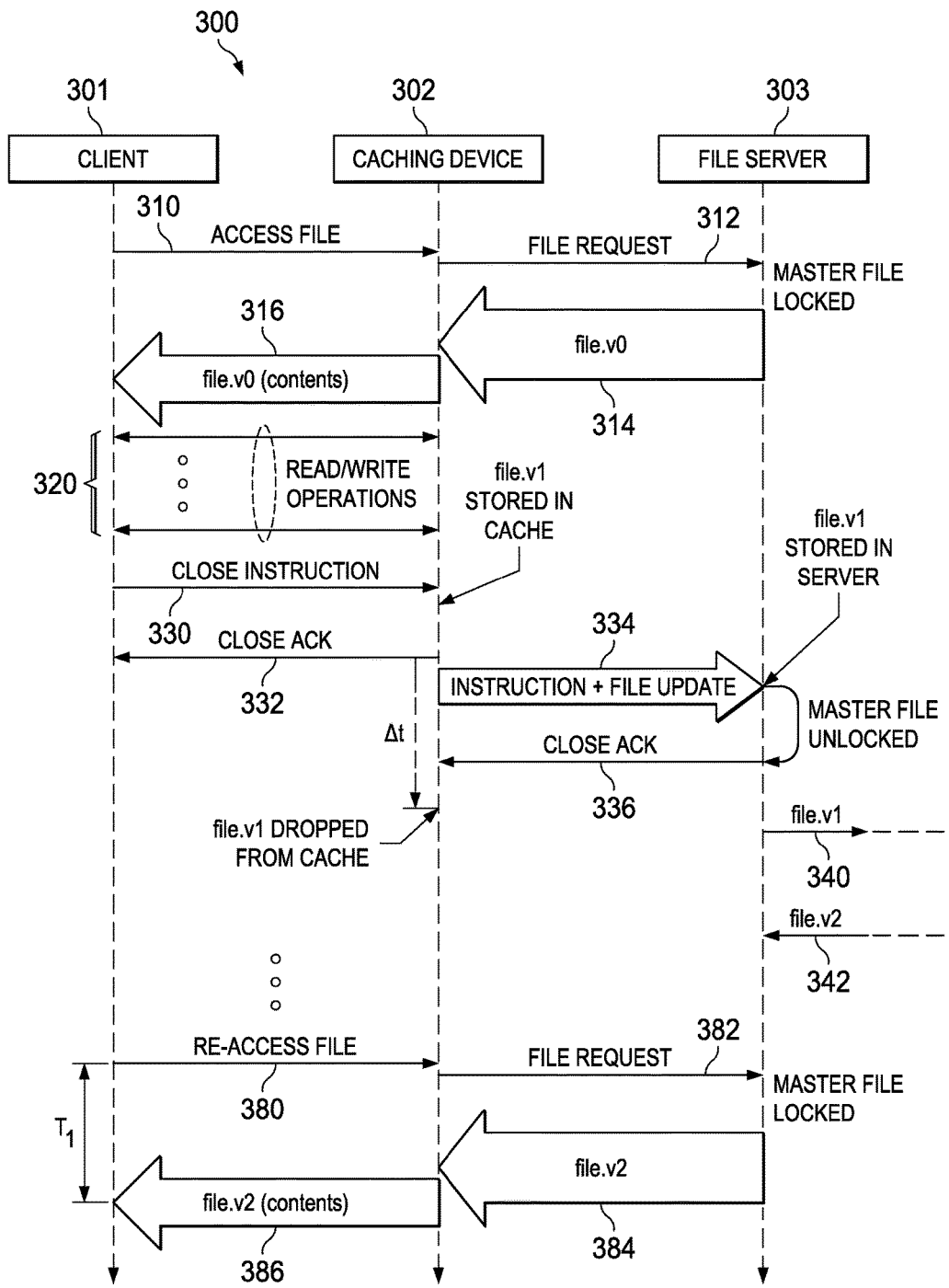
FIG. 3 illustrates a protocol diagram of a communications sequence for conventional file caching.

Conventional caching techniques fetch files only after they are accessed by a user. FIG. 3 illustrates a communications sequence 300 for conventional file caching, as may occur between a client 301, a caching device 302, and a file server 303. As shown, the communications sequence begins when the client attempts to access a file 310, which prompts the caching device 302 to send a file request 312 to the file server 303 in order to fetch a version of the file (file.v0) 314. Thereafter, the file contents of file.v0 (file.v0(contents)) 316 are then provided to the client 301, after which a series of read/write operations 320 are performed prior to closing the file via the close instructions 330. Upon receiving the close instructions 330, the caching device 302 stores an updated version of file.v0 (file.v1) in the cache, sends a close acknowledgment 332 to the client 301, and exchanges a close instruction 334 and close acknowledgment 336 with the file server 303. Notably, the close instructions may include a file update so that the file server can update the master file from file.v0 to file.v1. After a period of time ($\Delta t$), the caching device 302 drops the file.v1 from the cache. The master file may be locked when the file.v0 314 is sent to the caching device, and unlocked when the close instruction 334 is received so that writeable versions of the master file cannot be checked out by other users. Once the master file is unlocked, the file.v1 may be fetched 340 and updated 342 by other users, and an updated version of file.v1 (file.v2) may be saved in the file server 303. At some point, the client 301 attempts to re-access the file 380, which prompts the caching device 302 to send a file request 382 to the file server 303 in order to fetch the latest version of the master file (file.v2) 384. The file contents of file.v2 (file.v2(contents)) 386 are then provided to the client 301, at which point the client may begin re-accessing the file. Notably, the client 301 may experience a substantial latency period ($T_1$) before re-accessing the file.

Figure 4A:
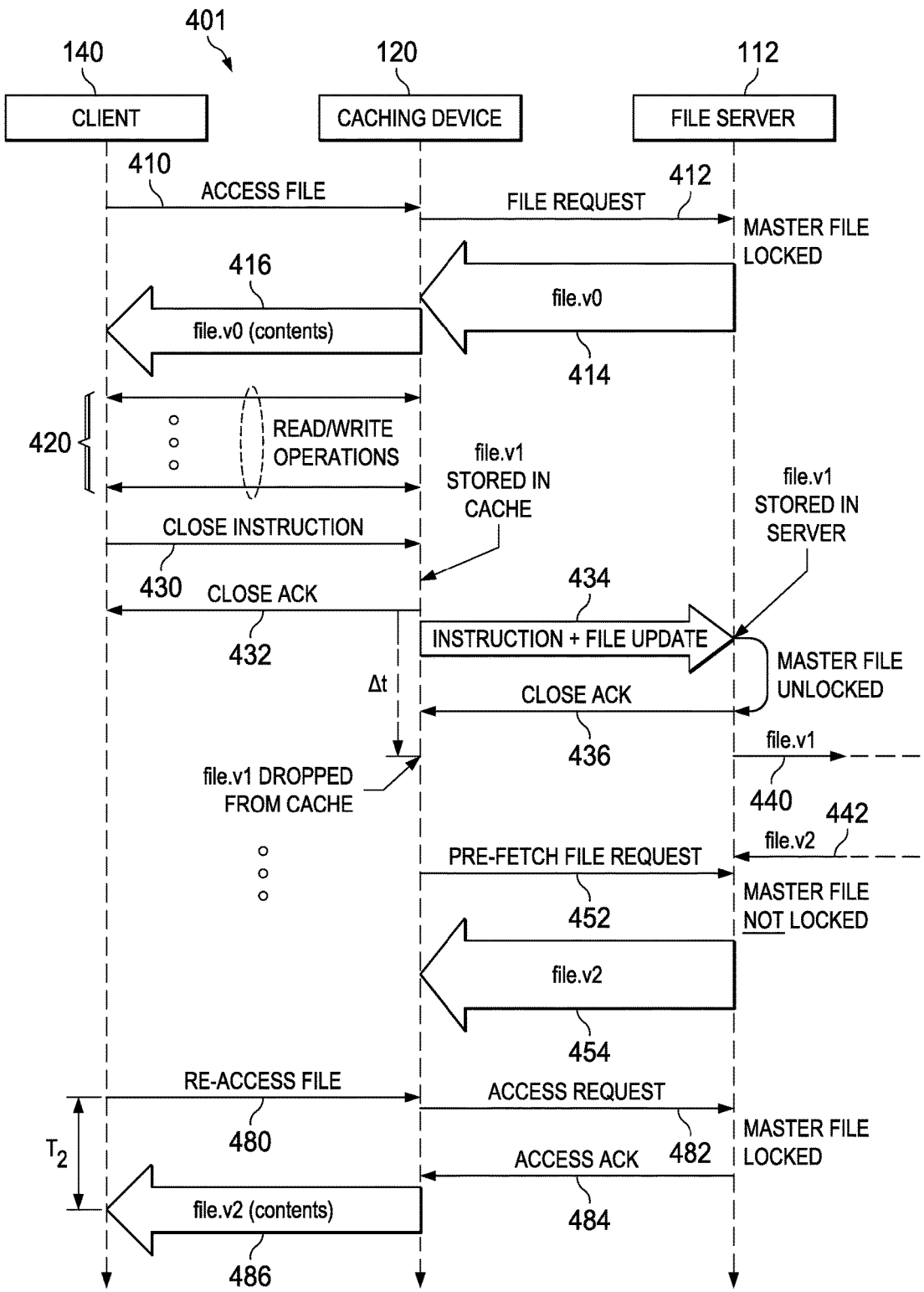
FIGS. 4A-4B illustrate protocol diagrams of communications sequences for embodiment file pre-fetching techniques.
Figure 4B:
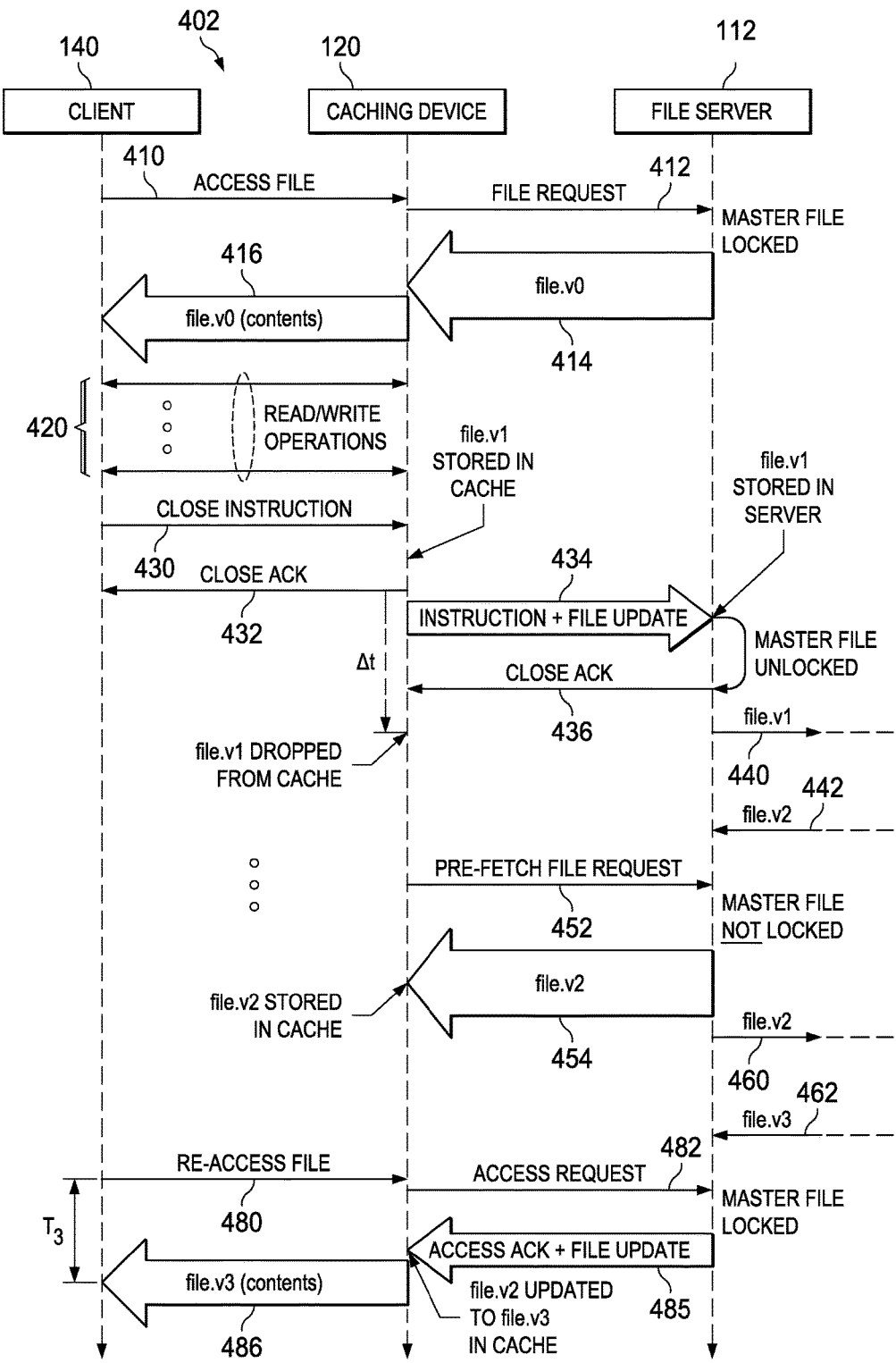

Aspects of this disclosure provide embodiment pre-fetching techniques that fetch files prior to the files being re-accessed by a client to reduce the latency period experienced by the client. FIGS. 4A-4B illustrate communications sequences 401, 402 for embodiment file caching techniques, as may occur between the file server 112, the caching device 120, and the client 140. As shown, the communications sequences 401, 402 include messaging 410-442 that may be similar to the messaging 310-342 described above. However, the communications sequences 401, 402 include pre-fetching operations 452, 454, which allow the client 140 to experience substantially lower latency periods than the client 301, e.g., $T2<T1$ and $T3<T1$.

More specifically, in the communications sequence 401, 402, the caching device 120 sends a pre-fetch file request 452 to the file server 112 prior to a time in which the client is likely to re-access the file. The pre-fetch file request 452 prompts the file.v2 454 to be communicated to the file server 112, where it is stored in the cache. In some embodiments, the pre-fetch file request 452 retrieves the file.v2 without causing the master file to be locked. In such embodiments, the caching device 120 and the file server 112 exchange an access request 482 and access acknowledgement 484 when the client 140 attempts to re-access the file 480, thereby causing the master file to be locked so that the file.v2 contents 486 can be provided to the user for editing. In the communications sequence 402, the file.v2 was modified 460, 462 by a third party after the file was pre-fetched and before the file was re-accessed, which caused a file update 485 to be communicated from the file server 112 to the caching device 120. The file update 485 may include differences between the file.v2 and an updated version of the file.v2 (file.v3), and may be used by the caching device 120 to update the pre-fetched file.v2 to the file.v3 in the cache. In some embodiments, the file.v2 contents 486 are provided to the client 140 before the access request 482 is sent to the file server 112, and a local version of the file.v2 is consolidated with any file updates at a later time, e.g., after the client has viewed and edited the file.

Figure 5:
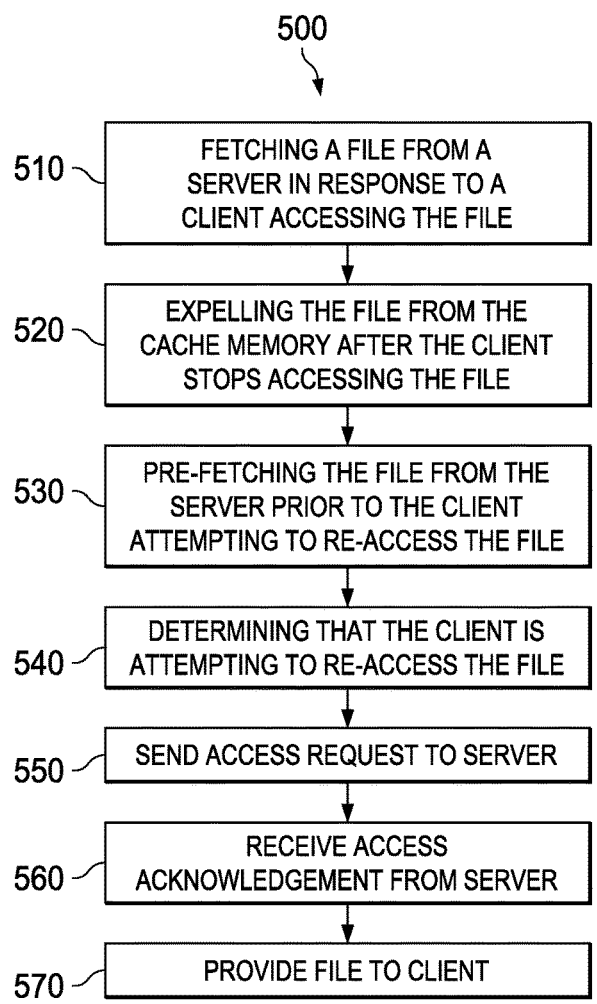
FIG. 5 illustrates a flowchart of an embodiment file pre-fetching method.

FIG. 5 illustrates an embodiment file pre-fetching method 500, as might be performed by a caching device. As shown, the method 500 begins with step 510, where the caching device fetches a file from a server in response to a client accessing the file. The file is stored in cache memory upon being fetched. Next, the method 500 proceeds to step 520, where the file is expelled from the cache memory after the client stops accessing the file. The file may be expelled any time after the client stops accessing the file. For example, the file may be expelled once it becomes stale or cold, e.g., the file has not been accessed frequently enough to warrant retaining it in the cache. Subsequently, the method 500 proceeds to step 530, where the caching device pre-fetches the file from the server prior to the client attempting to re-access the file. Notably, the file may be an editable electronic file. In such a case, a readable version of the file may be pre-fetched so that the file is not locked by the server, e.g., unable to be edited by other users. Alternatively, a writeable version of the editable electronic file may be pre-fetched, in which case the file is locked. In yet other embodiments, multiple writeable versions may be checked out simultaneously, with the discrepancies being reconciled at a later date. Next, the method 500 proceeds to step 540, where the caching device determines that the client is attempting to re-access the file. Thereafter, the method 500 proceeds to step 550, where the caching device sends an access request to the server. The access request may request that the server lock the file so that it cannot be edited by other users. Subsequently, the method 500 proceeds to step 560, where the caching device receives an access acknowledgement from the server. In some embodiments, the file may have been updated by another user since it was pre-fetched by the caching device. In such an embodiment, the access acknowledgement may be communicated with a file update. Subsequently, the method 500 proceeds to step 570, where the caching device provides the file to the client. Steps 550-560 may be omitted in embodiments where a writeable version of the file is pre-fetched during step 530.

As used herein, the term "pre-fetching the file" refers to the action of fetching an electronic file without being prompted to do so by a client attempting to access the electronic file. Moreover, the term "file" is used loosely to refer to any object (e.g., file content) having a common characteristic or classification, and therefore the phrase "pre-fetching the file" should not be interpreted as implying that the electronic file being fetched is identical to "the [electronic] file" that was previously accessed by the client. For example, the file being pre-fetched may be an updated version of an electronic file that was previously accessed by the client. As another example, the file being pre-fetched may be a new instance of a recurring electronic file type that was previously accessed by the client, e.g., a periodic earnings report, an agenda, etc. In such an example, the client may not have accessed any version of the electronic file being pre-fetched. To illustrate the concept, assume the client is a newspaper editor that edits a final draft of the Tuesday's Sports Section, and that the caching device pre-fetches an electronic version of a final draft of Wednesday's Sport Section. The phrase "prefetching the file" should be interpreted to encompass such a situation even though the content of Wednesday's Sports Section differs from that of Tuesday's Sports Section, as (in this instance) "the file" refers to a type or classification associated with Tuesday's Sports Section, rather than the content of Tuesday's Sports Section.

Figure 6A:
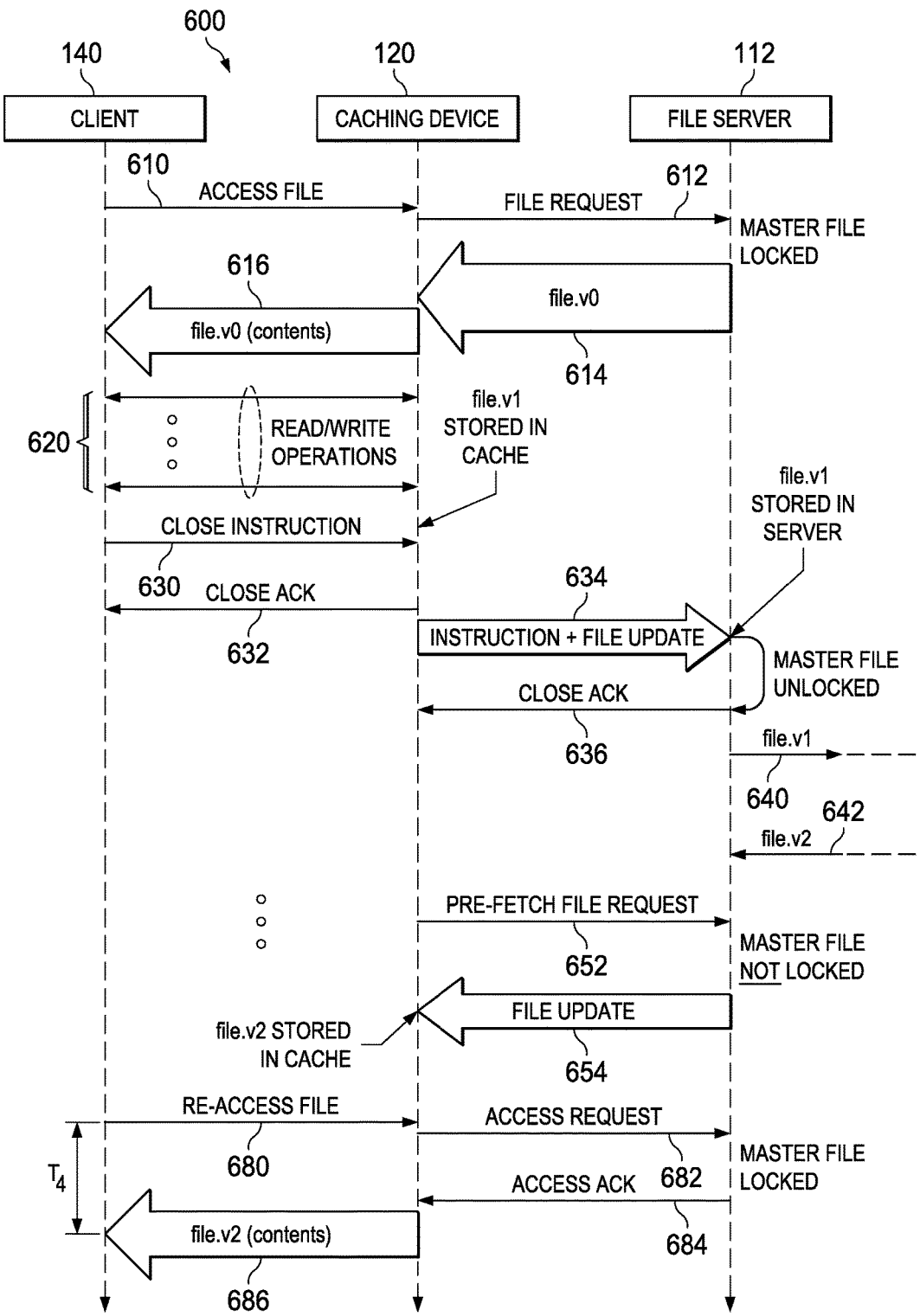
FIGS. 6A-6B illustrate protocol diagrams of communications sequences for additional embodiment file pre-fetching techniques.
Figure 6B:
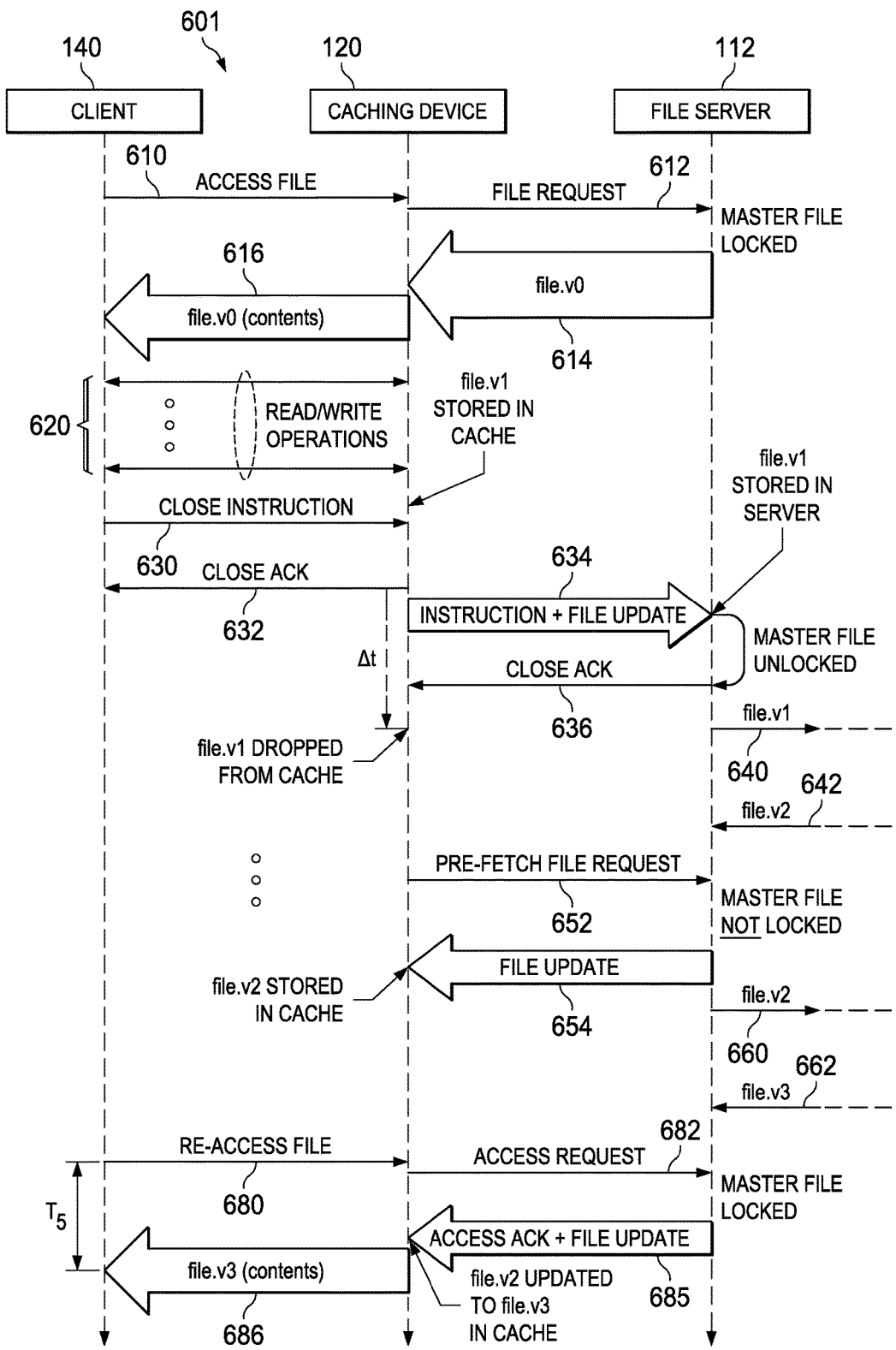

Aspects of this disclosure provide embodiment pre-fetching techniques that fetch file updates for files stored in a cache prior to the files being re-accessed by a client. FIGS. 6A-6B illustrate communications sequences 600, 601 for embodiment file caching techniques, as may occur between the file server 112, the caching device 120, and the client 140. As shown, the communications sequences 600-601 include messaging 610-686 that may be similar to the messaging 410-486 described above. However, the communications sequences 600-601 do not expel the file from the cache, and therefore pre-fetch the file updates 654, rather than the complete file.

Figure 7:
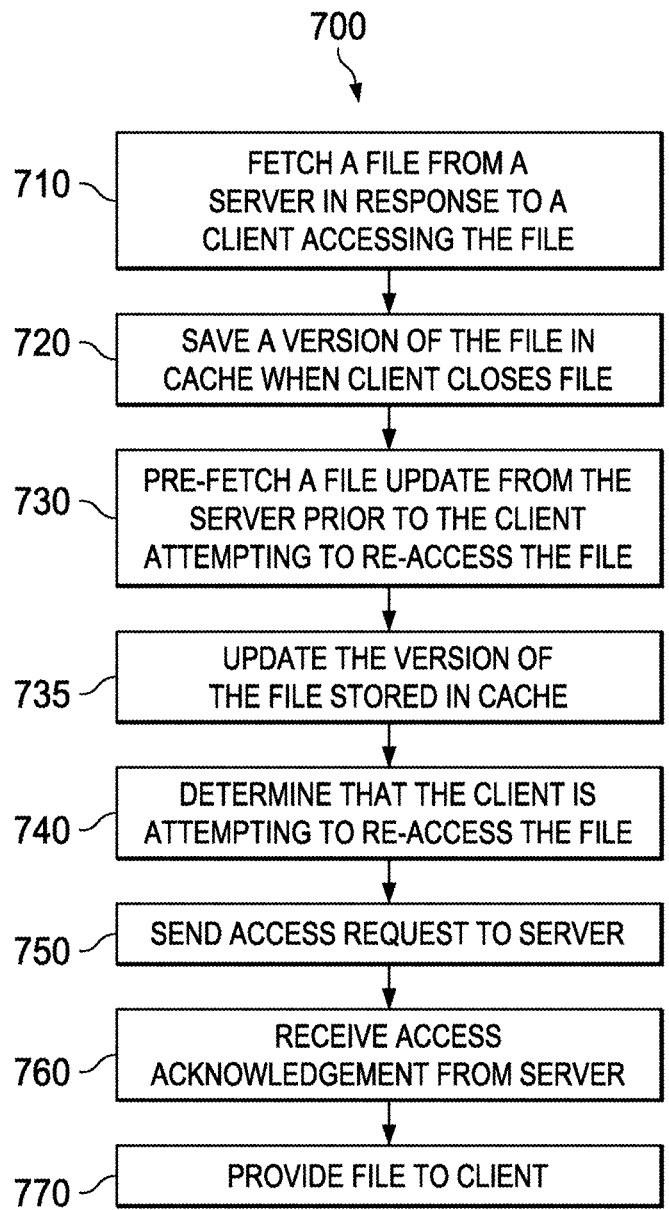
FIG. 7 illustrates a flowchart of another embodiment file pre-fetching method.

FIG. 7 illustrates an embodiment file pre-fetching method 700, as might be performed by a caching device. As shown, the method 700 begins with step 710, where the caching device fetches a file from a server in response to a client accessing the file. The file is stored in cache memory upon being fetched. Next, the method 700 proceeds to step 720, where a version of the file is saved in the cache memory when the client closes the file. Subsequently, the method 700 proceeds to step 730, where the caching device pre-fetches a file update for the file from the server prior to the client attempting to re-access the file. Subsequently, the method 700 proceeds to step 735, where the caching device uses the pre-fetched file update to update the version of the file stored in the cache memory. Next, the method 700 proceeds to step 740, where the caching device determines that the client is attempting to re-access the file. Thereafter, the method 700 proceeds to step 750, where the caching device sends an access request to the server. The access request may request that the server lock the file so that it cannot be edited by other users. Subsequently, the method 700 proceeds to step 760, where the caching device receives an access acknowledgement from the server. In some embodiments, the file may have been updated by another user since the file update was pre-fetched by the caching device, in which case the access acknowledgement may be communicated with a file update. Subsequently, the method 700 proceeds to step 770, where the caching device provides the file to the client. Steps 750-760 may be omitted in some embodiments.

Figure 8:
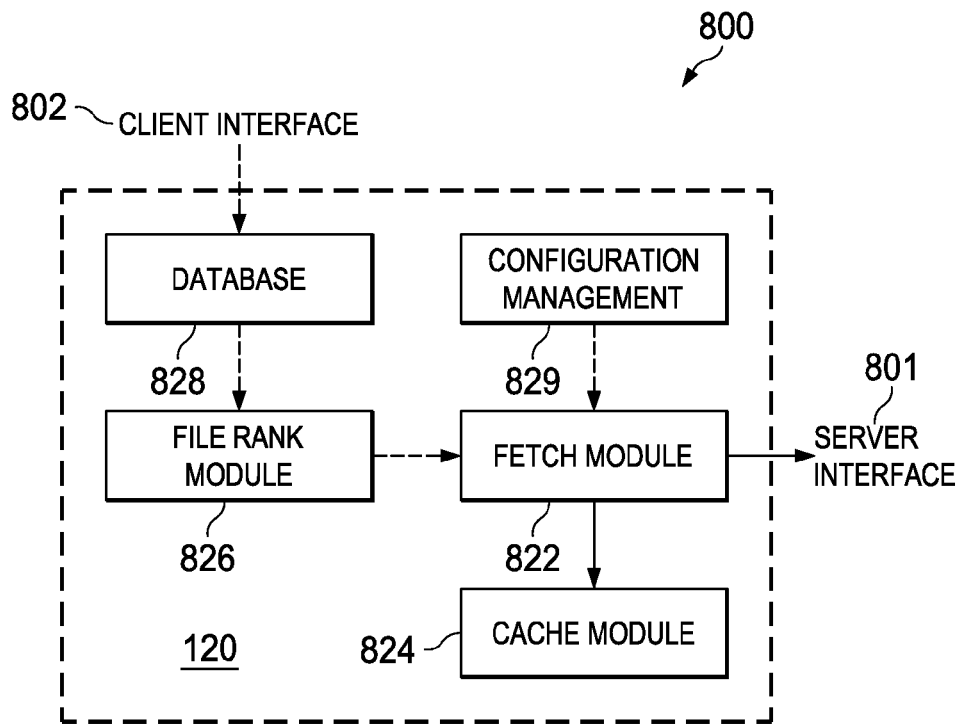
FIG. 8 illustrates a diagram of an embodiment file ranking architecture.

Aspects of this disclosure provide techniques for ranking files to determine which ones will be pre-fetched by the caching device. FIG. 8 illustrates an embodiment file ranking architecture 800, as may be included in the caching device 120. As shown, the embodiment file ranking architecture 800 includes a server interface 801, a client interface 802, a fetch module 822, a caching module 824, a file rank module 826, a database 828, and a configuration management module 829. The fetch module 822 may be any component or collection of components configured to fetch files over the server interface 801. The cache module 824 may be any component or collection of components configured to store files fetched by the fetch module. The file rank module 826 may be any component or collection of components configured to manage access rankings of files that are presently (or were previously) stored in the cache 824. The database 828 may be any component or collection of components configured to store attributes of the files being accessed over the client interface 802. The configuration management module 829 may be any component or collection of components configured to manipulate the fetch module 822 based on a client's access patterns and/or a file ranking provided by the rank module 826.

Figure 9:
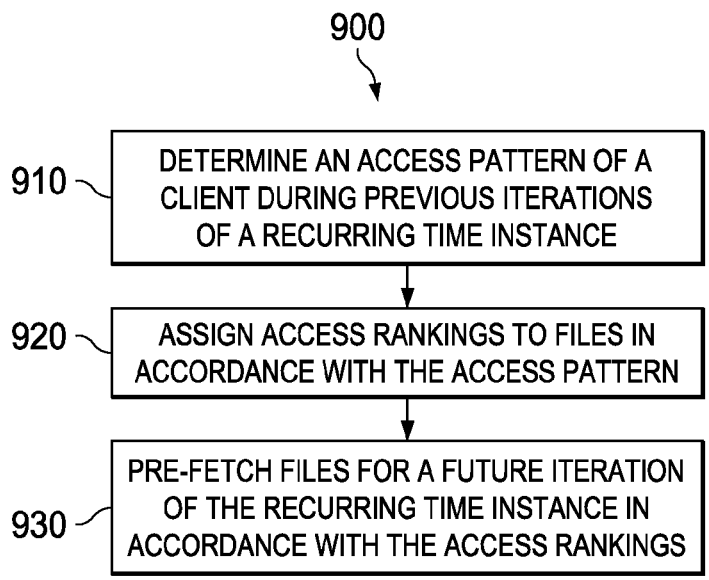
FIG. 9 illustrates a flowchart of an embodiment method for ranking files.

FIG. 9 illustrates an embodiment method 900 for pre-fetching ranked files, as might be performed by a caching device. As shown, the method 900 begins at step 910, where the caching device determines an access pattern of a client during previous iterations of a recurring time instance. Thereafter, the method 900 proceeds to step 920, where the caching device assigns access rankings to files in accordance with the determined access pattern. Subsequently, the method 900 proceeds to step 930, where the caching device pre-fetches files for a future iteration of the recurring time instance in accordance with the access rankings.

Figure 10:
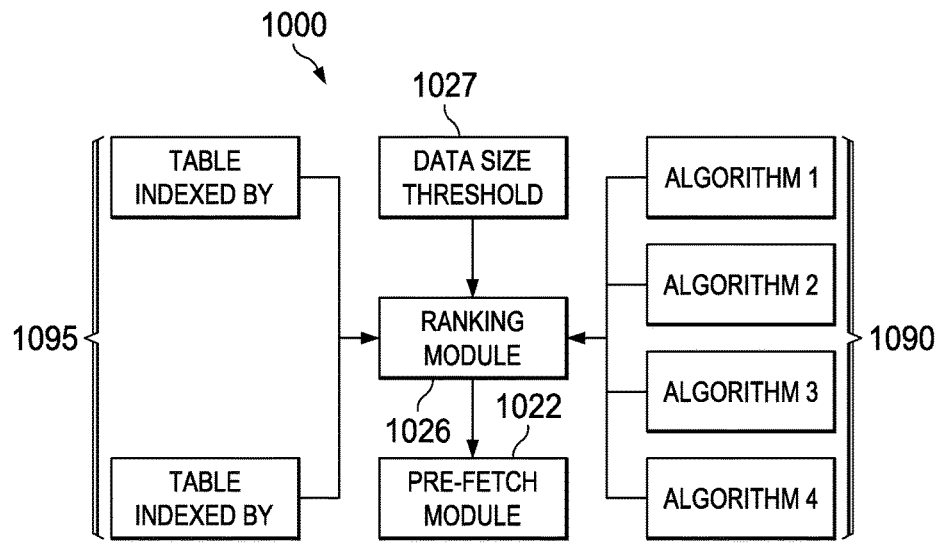
FIG. 10 illustrates a diagram of another embodiment file ranking architecture.

FIG. 10 illustrates an embodiment file ranking architecture 1000, as may be included in a caching device. As shown, the embodiment file ranking architecture 1000 includes a pre-fetch module 1022, a ranking module 1026, a plurality of file ranking algorithms 1090, and a plurality of indexing tables 1095. The pre-fetch module 1022 may be any component or collection of components configured to pre-fetch files based on a file ranking, the ranking module 1026 may be any component or collection of components configured to manage access rankings of files that are presently (or were previously) accessed by a client. The ranking module 1026 may instruct the pre-fetch module to fetch a certain number of files based on a data size threshold 1027, which may vary depending on the amount of network resources available at the time of pre-fetching activities. For example, more files/data may be pre-fetched during low usage periods than high usage periods. The ranking module 1026 may rank the files based on one or more of the algorithms 1090, and may store the ranked files in the indexing tables 1095. In embodiments, each of the indexing tables 1095 corresponds to a different period of time, e.g., 9 am-10 am, 10 am-11 am, 11 am-noon, etc.

Figure 11:
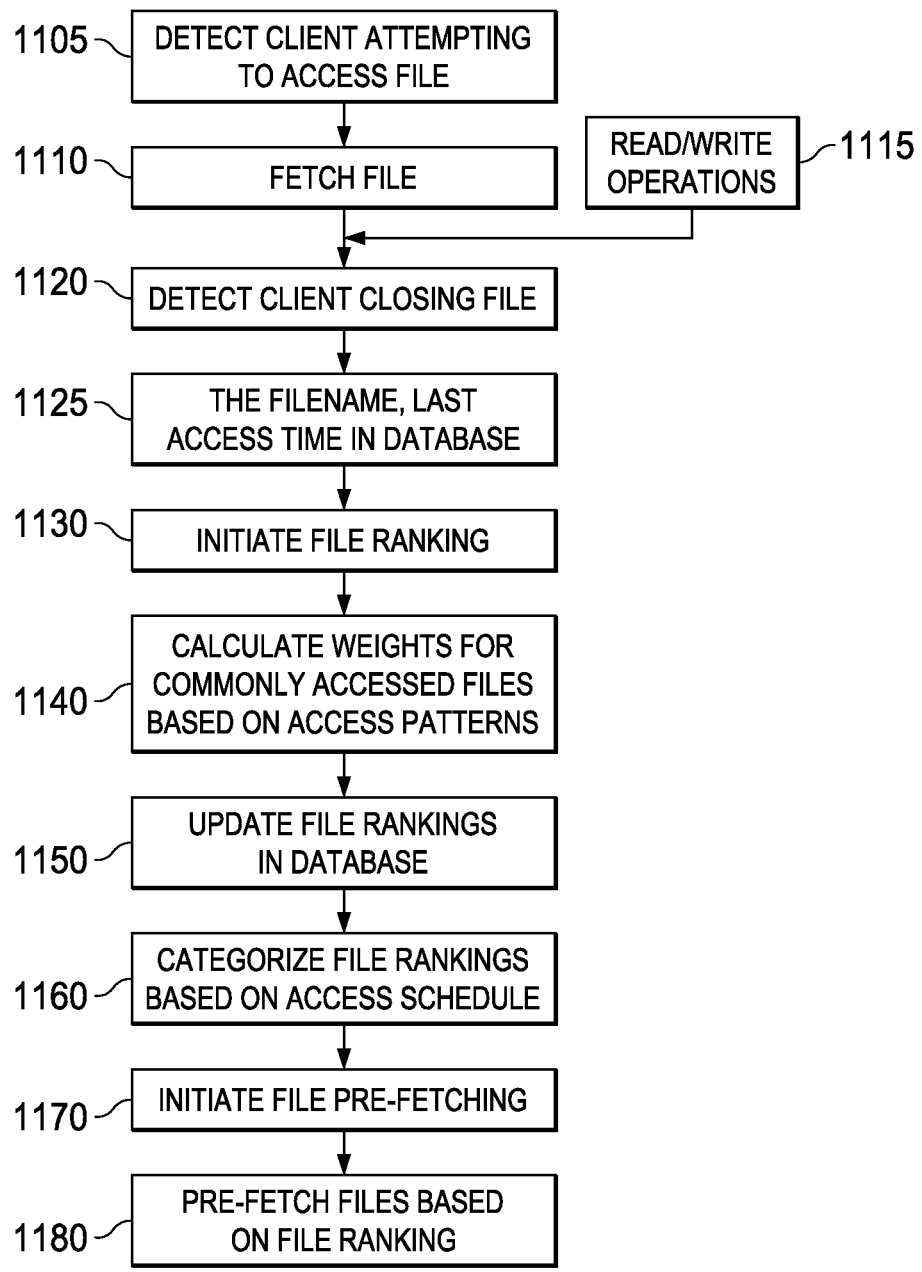
FIG. 11 illustrates a flowchart of yet another embodiment file pre-fetching method.

FIG. 11 illustrates an embodiment method 1100 for ranking files, as may be performed by a caching device. As shown, the method 1100 begins with step 1105, where the caching device detects that a client is attempting to access a file. Thereafter, the method 1100 proceeds to steps 1110, 1115, where the caching device fetches the file and conducts read/write operations. Subsequently, the method 1100 proceeds to steps 1120, 1125, where the caching device detects that the client has closed the file and stores an entry in the database associating the filename with a recent access time. Next, the method 1100 proceeds to steps 1130, 1140 where the device initiates file ranking and calculates weights for the commonly accessed files based on the client's access pattern. Thereafter, the method 1100 proceeds to steps 1150, 1160, where the device updates file rankings in the database based on the calculated weights, and categorizes the file rankings based on an access schedule. Finally, the method 1100 proceeds to steps 1170, 1180, where the device initiates file pre-fetching and pre-fetches files based on the file rankings.

Figure 12:
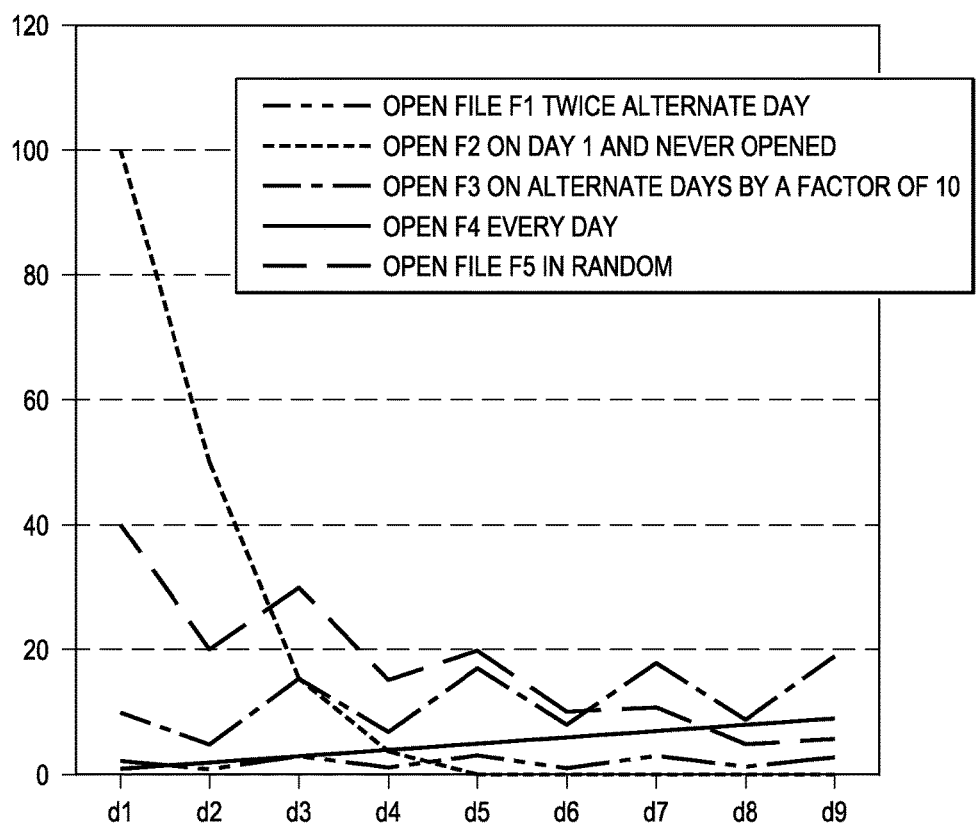
FIG. 12 illustrates a graph of client access patterns.
Figures 13, 14:
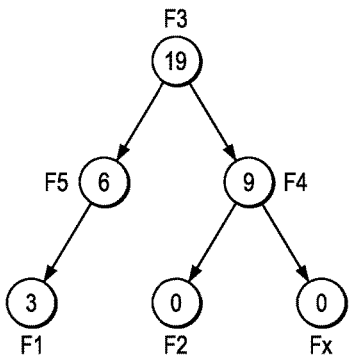
FIG. 13 illustrates a table of client access patterns.
FIG. 14 illustrates a graph of an embodiment file ranking methodology.

FIG. 12 illustrates a graph of a client access patterns. As shown, files are given an access rankings when they are initially opened, and the access rankings are adjusted based on the frequency in which the files are accessed thereafter. FIG. 13 illustrates a table of a client access pattern. FIG. 14 illustrates a graph of an embodiment file ranking methodology. As shown, the files are ranked according to a binary tree, with the higher ranked files, e.g., F3, being positioned above the lower ranked files, e.g., F5, etc.

Figure 15:
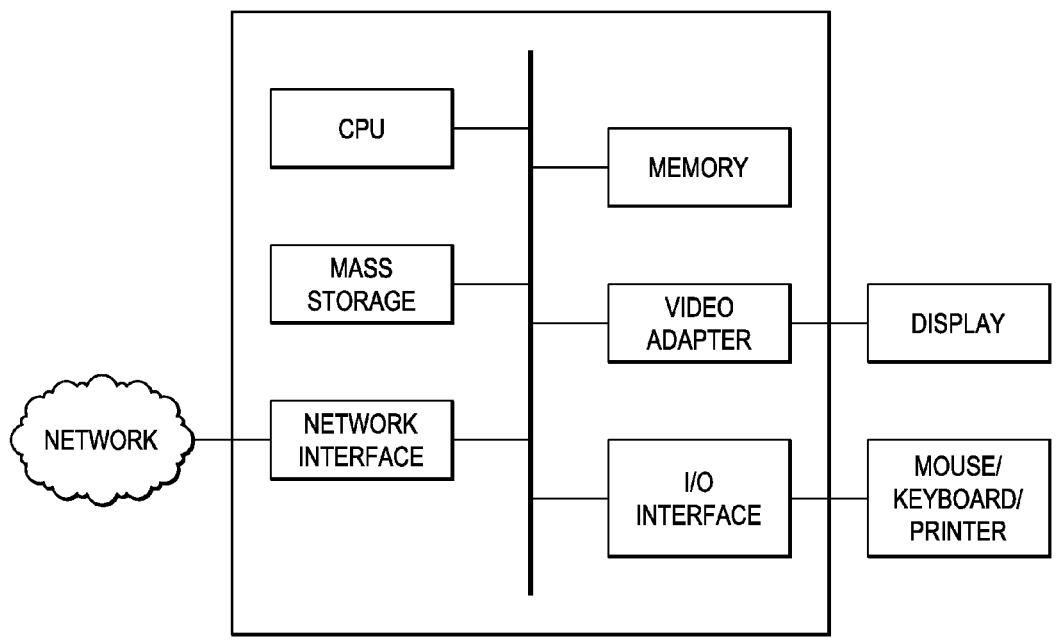
FIG. 15 illustrates a diagram of an embodiment computing platform.

FIG. 15 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 16:
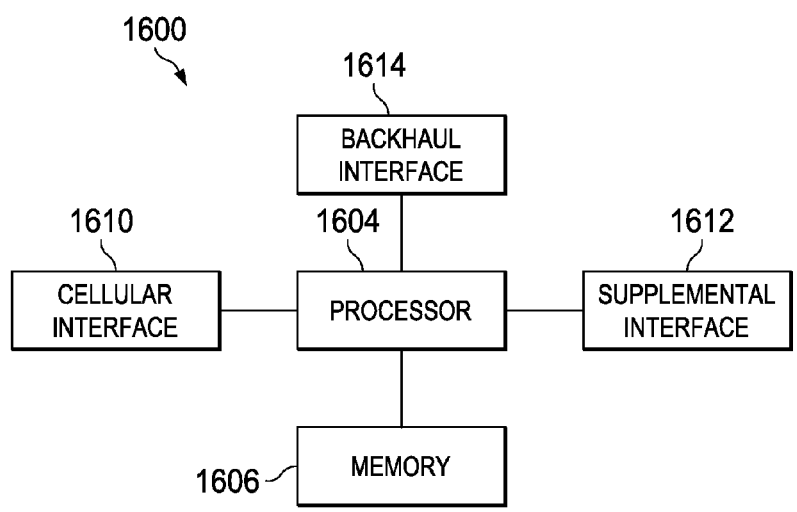
FIG. 16 illustrates a diagram of an embodiment communications device.

FIG. 16 illustrates a block diagram of an embodiment of a communications device 1600, which may be equivalent to one or more devices (e.g., UEs, NBs, etc.) discussed above. The communications device 1600 may include a processor 1604, a memory 1606, a cellular interface 1610, a supplemental interface 1612, and a backhaul interface 1614, which may (or may not) be arranged as shown in FIG. 16. The processor 1604 may be any component capable of performing computations and/or other processing related tasks, and the memory 1606 may be any component capable of storing programming and/or instructions for the processor 1604.

The cellular interface 1610 may be any component or collection of components that allows the communications device 1600 to communicate using a cellular signal, and may be used to receive and/or transmit information over a cellular connection of a cellular network. The supplemental interface 1612 may be any component or collection of components that allows the communications device 1600 to communicate data or control information via a supplemental protocol. For instance, the supplemental interface 1612 may be a non-cellular wireless interface for communicating in accordance with a Wireless-Fidelity (Wi-Fi) or Bluetooth protocol. Alternatively, the supplemental interface 1612 may be a wireline interface. The backhaul interface 1614 may be optionally included in the communications device 1600, and may comprise any component or collection of components that allows the communications device 1600 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for efficient content access, the method comprising:
    fetching a file that is editable from a server in response to an individual client accessing the file, wherein the file is stored in a cache memory upon being fetched from the server;
    expelling the file from the cache memory after the individual client stops accessing the file;
    assigning an access ranking to the file based on how frequently the file was accessed by the individual client, the file being assigned a higher access ranking when the file is accessed more frequently by the individual client than when the file is accessed less frequently by the individual client; and
    pre-fetching the file from the server without the individual client attempting to re-access the file when the access ranking assigned to the file is one of the N highest access rankings amongst access rankings assigned to a set of editable files commonly accessed by the individual client, where N is an integer greater than or equal to one, the file being pre-fetched from the server after having been expelled from the cache memory, wherein the file is re-stored in the cache memory upon being pre-fetched from the server.

2. The method of claim 1, wherein the individual client does not attempt to access the file during an intermediate period between expulsion of the file from the cache memory and pre-fetching of the file from the server.

3. The method of claim 2, further comprising:
    providing an updated version of the file to the individual client at a future time instance without retrieving any additional file content of the file from the server at the future time instance, the future time instance corresponding to a time in which the individual client re-accesses the file.

4. The method of claim 1, wherein pre-fetching the file from the server comprises fetching an updated version of the file from the server.

5. The method of claim 3, wherein the future time instance is a future iteration of a recurring time instance, and wherein the access ranking comprises a weighted value corresponding to a frequency in which the individual client has accessed the file during previous iterations of the recurring time instance.

6. An apparatus comprising:
    a processor; and
    a non-transitory computer readable storage medium storing programming including instructions for execution by the processor, to perform:
    fetch a file that is editable from a server in response to an individual client accessing the file, wherein the file is stored in a cache memory upon being fetched from the server;
    expel the file from the cache memory after the individual client stops accessing the file;
    assign an access ranking to the file based on how frequently the file was accessed by the individual client, the file being assigned a higher access ranking when the file is accessed more frequently by the individual client than when the file is accessed less frequently by the individual client; and
    pre-fetch the file from the server without the individual client attempting to re-access the file when the access ranking assigned to the file is one of the N highest access rankings amongst access rankings assigned to a set of editable files commonly accessed by the individual client, where N is an integer greater than or equal to one, the file being pre-fetched from the server after having been expelled from the cache memory, wherein the file is re-stored in the cache memory upon being pre-fetched from the server.

7. A method for efficient content access, the method comprising:
    fetching a file that is editable from a server in response to an individual client accessing the file;
    storing a version of the file in a cache memory when the individual client stops accessing the file;
    assigning an access ranking to the file based on how frequently the file was accessed by the individual client, the file being assigned a higher access ranking when the file is accessed more frequently by the individual client than when the file is accessed less frequently by the individual client;
    pre-fetching a file update for the file from the server without the individual client attempting to re-access the file when the access ranking assigned to the file is one of the N highest access rankings amongst access rankings assigned to a set of editable files commonly accessed by the individual client, where N is an integer greater than or equal to one, the file update being pre-fetched from the server after the individual client has stopped accessing the file; and
    using the file update to update the version of the file stored in the cache memory prior to the individual client attempting to re-access the file.

8. The method of claim 7, providing an updated version of the file to the individual client at a future time instance without fetching any additional content related to the file from the server.

9. The method of claim 7, wherein the individual client does not attempt to re-access the file during an intermediate period between storing the version of the file in the cache memory and pre-fetching the file update.

10. The method of claim 8, wherein the future time instance is a future iteration of a recurring time instance, and wherein the access ranking comprises a weighted value corresponding to a frequency in which the individual client has accessed the file during previous iterations of the recurring time instance.

11. An apparatus comprising:
a processor; and
a non-transitory computer readable storage medium storing programming including instructions for execution by the processor, to perform:
fetch a file that is editable from a server in response to an individual client accessing the file;
store a version of the file in a cache memory when the individual client stops accessing the file;
assign an access ranking to the file based on how frequently the file was accessed by the individual client, the file being assigned a higher access ranking when the file is accessed more frequently by the individual client than when the file is accessed less frequently by the individual client;
pre-fetch a file update for the file from the server without the individual client attempting to re-access the file when the access ranking assigned to the file is one of the N highest access rankings amongst access rankings assigned to a set of editable files commonly accessed by the individual client, where N is an integer greater than or equal to one, the file update being pre-fetched from the server after the individual client has stopped accessing the file; and
use the file update to update the version of the file stored in the cache memory prior to the individual client attempting to re-access the file.

12. A method for pre-fetching files from a server, the method comprising:
determining an access pattern of an individual client during previous iterations of a recurring time instance, the access pattern corresponding to a frequency in which a plurality of files are accessed by the individual client during previous iterations of a recurring time instance, wherein the plurality of files are editable;
assigning access rankings to the plurality of files in accordance with the access pattern of the individual client, wherein files that were accessed more frequently by the individual client are assigned higher access rankings than files that were accessed less frequently by the individual client; and
pre-fetching one or more files in the plurality of files having the N highest access rankings from one or more servers without the individual client attempting to access the one or more files, where N is an integer greater than or equal to one, the one or more files being pre-fetched prior to a future iteration of the recurring time instance, wherein the one or more files are stored in a cache memory after being pre-fetched from the one or more servers.

13. The method of claim 12, wherein pre-fetching the one or more files from the server comprises pre-fetching an updated version of a first file in the one or more files.

14. The method of claim 12, wherein pre-fetching the one or more files from the server comprises:

pre-fetching a file update of a first file in the one or more files, wherein a version of the first file is stored in the cache memory prior to the file update being pre-fetched; and
using the file update to update the version of the first file stored in the cache memory prior to the individual client attempting to re-access the first file.

15. The method of claim 12, wherein assigning access rankings to the files in accordance with the access pattern comprises:
incrementing a weighted value each time the individual client accesses a first file during an iteration of the recurring time instance, the weighted value being associated with an access ranking assigned to the first file; and
decrementing the weighted value when the first file is not accessed by the individual client for a predetermined period.

16. The method of claim 15, wherein the recurring time instance comprises a periodic interval of a day, week, month, or year.

17. An apparatus comprising:
a processor; and
a non-transitory computer readable storage medium storing programming including instructions for execution by the processor, to perform:
determine an access pattern of an individual client during previous iterations of a recurring time instance, the access pattern corresponding to a frequency in which a plurality of files are accessed by the individual client during previous iterations of a recurring time instance, wherein the plurality of files are editable;
assign access rankings to the plurality of files in accordance with the access pattern of the individual client, wherein files that were accessed more frequently by the individual client are assigned higher access rankings than files that were accessed less frequently by the individual client; and pre-fetch one or more files in the plurality of files having the N highest access rankings from one or more servers without the individual client attempting to access the one or more files, the one or more files being pre-fetched prior to a future iteration of the recurring time instance, wherein the one or more files are stored in a cache memory after being pre-fetched from the one or more servers.

18. The apparatus of claim 17, wherein the instructions to assign access rankings to the plurality of files in accordance with the access pattern include instructions to:
increment a weighted value each time the individual client accesses a first file during an iteration of the recurring time instance, the weighted value being associated with an access ranking assigned to the first file; and
decrement the weighted value when the first file is not accessed by the individual client for a predetermined period.

19. The apparatus of claim 18, wherein the recurring time instance comprises a periodic interval of a day, week, month, or year.

20. The method of claim 1, wherein assigning the access ranking to the file based on how frequently the file was accessed by the individual client comprises:
incrementing a weighted value each time the individual client accesses the file during an iteration of a recurring time instance, the weighted value being associated with the access ranking assigned to the file; and decrementing the weighted value when the file is not accessed by the individual client for a predetermined period.

21. The method of claim 20, wherein the recurring time instance comprises a periodic interval of a day, week, month, or year.

22. The apparatus of claim 6, wherein the instructions to assign the access ranking to the file based on how frequently the file was accessed by the individual client includes instructions to:
increment a weighted value each time the individual client accesses the file during an iteration of a recurring time instance, the weighted value being associated with the access ranking assigned to the file; and
decrement the weighted value when the file is not accessed by the individual client for a predetermined period.

23. The apparatus of claim 22, wherein the recurring time instance comprises a periodic interval of a day, week, month, or year.

24. The method of claim 7, wherein assigning the access ranking to the file based on how frequently the file was accessed by the individual client comprises:
incrementing a weighted value each time the individual client accesses the file during an iteration of a recurring time instance, the weighted value being associated with the access ranking assigned to the file; and
decrementing the weighted value when the file is not accessed by the individual client for a predetermined period, wherein the recurring time instance comprises a periodic interval of a day, week, month, or year.

25. The apparatus of claim 11, wherein the instructions to assign the access ranking to the file based on how frequently the file was accessed by the individual client includes instructions to:
increment a weighted value each time the individual client accesses the file during an iteration of a recurring time instance, the weighted value being associated with the access ranking assigned to the file; and
decrement the weighted value when the file is not accessed by the individual client for a predetermined period, wherein the recurring time instance comprises a periodic interval of a day, week, month, or year.

* * * * *